(12) United States Patent
Alberganti et al.

(10) Patent No.: US 11,262,004 B2
(45) Date of Patent: Mar. 1, 2022

(54) METALLIC PIPE CONNECTION

(71) Applicant: GIACOMINI S.P.A., San Maurizio d'Opaglio (IT)

(72) Inventors: Giacomo Alberganti, Invorio (IT); Giuliano Ruga, Gozzano (IT)

(73) Assignee: GIACOMINI S.P.A., San Maurizio d'Opaglio (IT)

(*) Notice: Subject to any disclaimer, the term of this patent is extended or adjusted under 35 U.S.C. 154(b) by 103 days.

(21) Appl. No.: 16/301,686

(22) PCT Filed: Nov. 6, 2017

(86) PCT No.: PCT/IB2017/056922
§ 371 (c)(1),
(2) Date: Nov. 14, 2018

(87) PCT Pub. No.: WO2018/100450
PCT Pub. Date: Jun. 7, 2018

(65) Prior Publication Data
US 2019/0285206 A1    Sep. 19, 2019

(30) Foreign Application Priority Data

Nov. 29, 2016   (IT) .................. 102016000120936

(51) Int. Cl.
 *F16L 13/14*    (2006.01)
 *F16L 17/02*    (2006.01)
(52) U.S. Cl.
 CPC ............ *F16L 13/142* (2013.01); *F16L 13/141* (2013.01); *F16L 17/02* (2013.01)
(58) Field of Classification Search
 CPC ....... F16L 13/142; F16L 13/14; F16L 13/141; F16L 17/02; F16L 21/02; F16L 21/03
(Continued)

(56) References Cited

U.S. PATENT DOCUMENTS 3,186,739 A * 6/1965 Mahoff
4,133,563 A * 1/1979 Yamazaki ............... F16L 21/03
                                                      285/345
(Continued)

FOREIGN PATENT DOCUMENTS

DE    19507688 A1 *  9/1996  ............ F16L 13/142
DE    19930549 C1    3/2001
(Continued)

OTHER PUBLICATIONS

EPO, "International Search Report for related international application serial No. PCT/IB2017,056922 filed Nov. 6, 2017", ISR received on Jan. 26, 2018. (5 Pages).

(Continued)

*Primary Examiner* — Matthew Troutman
*Assistant Examiner* — William S. Choi
(74) *Attorney, Agent, or Firm* — Mark Malek; Widerman Malek, PL

(57)    ABSTRACT

A metallic pipe connection may comprise a tubular body and a terminal tubular engagement portion configured to be engaged on a pipe and to be fixed thereto by means of plastic deformation of the engagement portion, and a terminal flange on the opposite side of the tubular body with respect to that one provided with the tubular engagement portion. The tubular engagement portion may include an annular seat for a sealing gasket, having a first housing groove for the sealing gasket which may be internally open towards the tubular engagement portion, and at least part of the tubular engagement portion and the annular seat may be plastically deformed such to generate a mechanical seal on the pipe on which the tubular engagement portion is fitted.

8 Claims, 4 Drawing Sheets

(58) Field of Classification Search
USPC .... 285/382, 344, 345, 339, 374, 379, 382.4,
285/382.5, 399
See application file for complete search history.

(56) References Cited

U.S. PATENT DOCUMENTS

| | | | |
|---|---|---|---|
| 5,168,618 A * | 12/1992 | Unewisse | F16L 13/142 |
| 9,707,820 B2 * | 7/2017 | Yamashita | |
| 2008/0272593 A1 | 11/2008 | Viegener et al. | |
| 2010/0148495 A1 | 6/2010 | Glaze et al. | |

FOREIGN PATENT DOCUMENTS

| | | | | |
|---|---|---|---|---|
| EP | 0870964 | A1 | 10/1998 | |
| EP | 1026431 | A1 | 8/2000 | |
| EP | 1026431 | B1 * | 11/2001 | F16L 13/142 |
| WO | WO-2018051299 | A1 * | 3/2018 | F16L 13/142 |

OTHER PUBLICATIONS

EPO, "Written Opinion for elated international application serial No. PCT/IB2017,056922 filed Nov. 6, 2017", WO received on Jan. 26, 2018. (8 Pages).

* cited by examiner

METALLIC PIPE CONNECTION

CROSS REFERENCE TO RELATED APPLICATIONS

This is a national stage application under 35 U.S.C. § 371 of POT patent application PCT/IB2017/056922, filed on Nov. 6, 2017, which claims the benefit of IT 102016000120936, filed on Nov. 29, 2016, each of which is hereby incorporated by reference in its entirety.

TECHNICAL FIELD

The present invention relates to the field of metallic pipe connections, particularly in hydraulic industry, and more specifically to connections made by plastically deforming one or both parts being connected.

PRIOR ART

Several types of watertight connections between flanges, pipes, fittings and the like in hydraulic industry are known from prior at One of such types provides to locally plastically deform one or both parts that have to be connected, typically by applying a suitable force, for example by means of a pliers deformation tool, such as described in prior art document published as EP1223008, that can be electrically powered, or more simply, manually powered; in the art such connection type is usually defined as press fitting system or press fitting.

Such type of connection is obtainable on pipes with diameters usually ranging from 10 mm to 108 mm and for each diameter the geometrical characteristics of components are more or less proportionally modified. Parts to be connected typically are a flange or a fitting and a pipe piece wherein a fluid flows (usually water) and between which a watertight effect has to be accomplished such to avoid leakages. To this end the two parts to be connected are fitted inside each other such to cause materials to overlap and the outermost part comprises an annular profile that forms a seat for an O-ring (or similar annular gasket). The O-ring—with parts fitted inside each other—is placed inside the outermost part and it faces the innermost part, thus it is arranged at the connection region.

A particular type of O-ring that can be used is that known in the art as LBP (English acronym for "Leakage Before Press"), which performs a watertight effect only when parts to be connected are properly deformed, while letting fluid to flow when plastic deformation does not occur, when it is incomplete or not pursuant to design data. The annular profile that defines the O-ring seat protrudes outwardly from the shell wall of the part that, in the joint, is the outermost part, such that, during plastic deformation operation, the pressing tool acts also on the material of the profile by deforming it and by bringing the O-ring housed therein in watertight condition.

The annular profile, depending on solutions provided by different manufacturers, has several geometries, such that, in order to obtain the connection just described, it is necessary to choose the appropriate pliers deformation tool (or the shape of pliers). This results in a reduced versatility of such types of connections since—if products of different manufacturers are desired to be used—it would be necessary to have tools (or pliers) suitable for each geometry.

In order to overcome such drawback, solutions have been found over time wherein only one tool is usable for different geometries, even if versatility is not complete, since such tools cannot be used generally for all the available geometries, but only for some of them. Another drawback, in the practice, is that O-rings are not always homogeneously pressed by the deformation of the metal, with the risk of leakages or failures of O-rings.

This occurs more frequently when using tools not specific for the particular type of fitting and/or O-ring being used. A common drawback of known solutions is the fact that, due to the same operating principle, residual stresses are inevitably generated after the deformation due to pressing by pliers. Such residual deformations cause the structure of the fitting to weaken and can trigger crack or leak forming processes, resulting in easily conceivable consequences.

OBJECTS AND SUMMARY OF THE INVENTION

Generally the object of the present invention is to overcome prior art drawbacks mentioned above. Particularly the main object of the invention is to provide a connection able to allow sealing O-rings, both LBP types and not, to be uniformly compressed. Another object of the invention is to provide a connection able to house different types of LBP O-rings. Still another object of the invention is to provide a connection where a controlled deformation is obtained allowing residual stresses to be reduced after the deformation caused by the pressing by tools or pliers.

Another object of the present invention is to provide a connection where the force necessary to generate the plastic deformation is reduced. One object, not last, of the present invention is to provide a connection of the above mentioned type usable by many different tools or pliers. These and other objects of the present invention are achieved by a metallic pipe connection, particularly a press fitting, that embodies the characteristics of the annexed claims, particularly claim 1, which form an integral part of the present description and to which reference has to be made for the sake of brevity.

However dependent claims are about detailed and additional constructional characteristics of the metallic pipe connection of the invention. Therefore the object of the invention is a metallic pipe connection, comprising a tubular body which has two opposite open ends and comprises:

a terminal tubular engagement portion configured to be engaged—in operative condition on a pipe and to be fixed thereto by means of plastic deformation of the engagement portion;

a terminal flange on the opposite side of the body with respect to the one provided with the tubular engagement portion, wherein the tubular engagement portion comprises an annular seat for a sealing gasket, the annular seat projecting externally from said tubular engagement portion and being provided with a first housing groove for said sealing gasket, said first housing groove being internally open towards the tubular engagement portion, and wherein at least part of the tubular engagement portion and the annular seat are configured to be plastically deformed such to generate a mechanical seal on the pipe on which the tubular engagement portion is fitted and a contemporaneous fluid tightness between the connection and said pipe by means of said sealing gasket; particularly the first groove housing the sealing gasket comprises inclined annular inner walls, the angle between said annular inner walls ranging from 5° to 15°.

The Applicant has found that such geometry allows the following advantages to be obtained:

it is possible to better follow the deformation caused by pliers pressing on the outer surface of the connection;

a better deformation is obtained;

the sealing gasket is compressed in a more complete and uniform manner by pliers;

sealing gaskets even different from each other can be used with an optimal tightness regardless of the type;

the connection is usable with pipes of different materials, therefore it is more versatile and ductile compared to prior art known solutions;

during manufacturing of the connection the shaving discharge is improved (a not negligible production advantage).

Such advantages are enhanced when the angle between said annular inner walls ranges from 9° to 11°, and still more preferably approximately equal to 10°: this helps in obtaining a particularly controlled and uniform plastic deformation, not found in prior art. According to an optional and advantageous characteristic also independent from other characteristics, the annular seat protrudes externally from the tubular engagement portion with a substantially inverted "V"-shaped profile comprising at least two inclined annular outer walls, the angle between said annular outer walls ranging from 55° to 75°.

Moreover, more in details, this embodiment surprisingly and advantageously allows different types of tools (or pliers) to be used, particularly those classified in the art as V, M, SA, VUS and it can be applied both to copper and steel pipes.

According to an optional and advantageous characteristic, also independent from other characteristics, the annular outer walls are connected to an outer cylindrical wall of the tubular engagement portion according to a first fillet radius equal for both the annular outer walls and are connected with each other at the vertex of the "V" according to a second fillet radius different from the first fillet radius. This avoids the provision of sharp edges that during the plastic deformation—when installing the connection—may generate cracks or weakening points of the connection and allows it to match the different profiles of the tools.

According to an optional and advantageous technical characteristic of the present invention, also independent from the other technical characteristics, the first fillet radius (R1) ranges from 0.5 to 1.5 mm and said second fillet radius (R2) ranges from 2.5 to 4.5 mm.

Further advantageous characteristics of the metallic pipe connection exclusively claimed herein are subject matter of annexed claims, which are an integral part of the present description.

BRIEF DESCRIPTION OF THE DRAWINGS

The invention will be described herein below with reference to preferred examples; provided by way of example and illustration, but not as a limitation; in the annexed drawings. These drawings show different aspects and embodiments of the invention and, where appropriate, reference numerals showing like structures, components, materials and/or elements in different figures are labeled by the same reference numerals. In annexed figures.

DETAILED DESCRIPTION OF THE INVENTION

Figure 1:
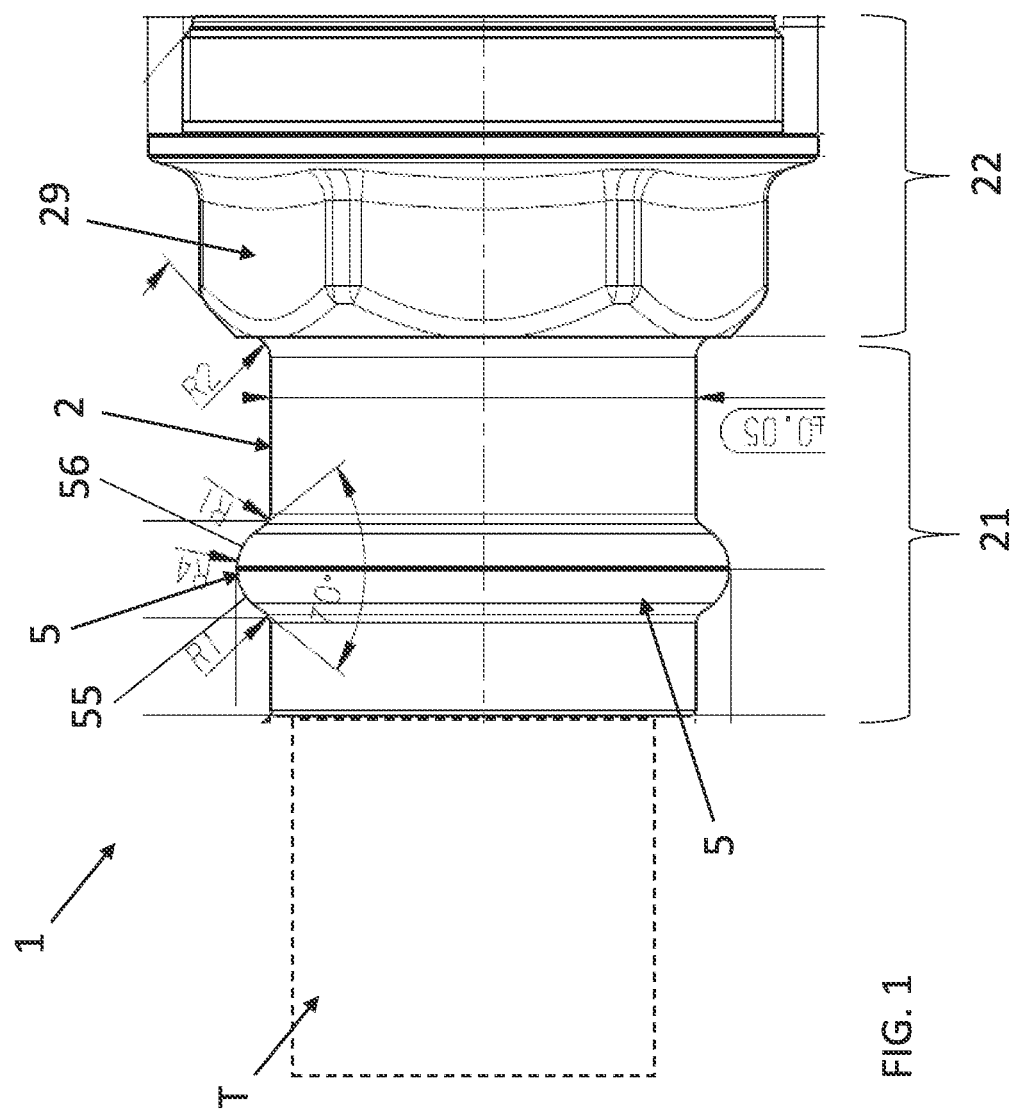
FIG. 1 is a side view of an embodiment of a connection according to the invention.

While the invention is susceptible of various modifications and alternative forms, some preferred embodiments are shown in the drawings and will be described below in details.

It should be understood, however; that there is no intention to limit the invention to the specific embodiment disclosed, but, on the contrary, the intention of the invention is to cover all modifications, alternative constructions and equivalents falling within the scope of the invention as defined in the claims. The use of "for example", "etc", "or" indicates non-exclusive alternatives without limitation, unless otherwise defined. The use of "includes" means "includes, but not limited to," unless otherwise defined. Terms as "vertical" and "horizontal", "upper" and "lower" (with no other indications) have to be read with reference to the assembling (or operating) conditions and with reference to the standard terminology in use in common speech, where "vertical" means a direction substantially parallel to that of the vector of the force of gravity "g" and horizontal means a direction perpendicular thereto.

With reference to annexed figures they show a connection according to the invention, generally denoted by 1. Particularly the metallic pipe connection 1 is a press fitting, where mechanical seal is generated by plastically deforming the connection upon installation. The connection 1 is particularly suitable for being applied to metallic pipes, for example copper or steel and it comprises a tubular body 2, it has two opposite open ends, aligned in this example.

The tubular body 2 comprises a terminal tubular engagement portion 21 configured to be engaged or fitted—in operative condition—on a pipe T (shown by broken line only in FIG. 1 for simplicity purposes) and to be fixed thereto by means of plastic deformation of the engagement portion 21, or at least a part thereof.

On the opposite side of the body 2 with respect to the one provided with the tubular engagement portion 21 there is provided a terminal flange 22, that, in this embodiment, has an outer diameter greater than that of the engagement portion 21 and, at least for a portion, it bears an hexagonal profile 29 for engagement of a tool, such as a hex wrench, by means of which the pipe T is clamped to another pipe piece (or valve coupling or the like) that, upon installation, is adjacent thereto. The tubular engagement portion 21 is cylindrical on the whole and it comprises an annular seat 5 for a sealing gasket 6, such as for example O-ring or LBP O-ring, Particularly the annular seat 5 protrudes externally from the tubular engagement portion 21 by protruding from the cylindrical walls thereof towards the outside.

The annular seat 5 defines a first housing groove 51 for the sealing gasket 6. More in details, in order to obtain water tightness on pipe T, the first housing groove 51 is open internally towards the terminal tubular engagement portion 21, and with the sealing gasket 6 in the mounted condition (as in FIG. 3) and with the connection 1 in plastically deformed condition, the sealing gasket 6 presses on the outer surface of the pipe T generating water tightness between it and the connection 1: this is true especially when the sealing gasket 6 is a LBP O-ring, while if it was a conventional O-ring (namely not LBP type), then water tightness could be present even before the plastic deformation of the connection 1 of the invention. To this end, it has to be noted that the plastic deformation to which the connection 1 of the invention is subjected upon installation involves at least part of the tubular engagement portion 21 and the annular seat 5, such to generate mechanical seal on pipe T on which the terminal tubular engagement portion 21 is fitted and contemporaneously to generate fluid tightness between the connection 1 and said pipe T by means of such sealing gasket 6.

Figure 3:
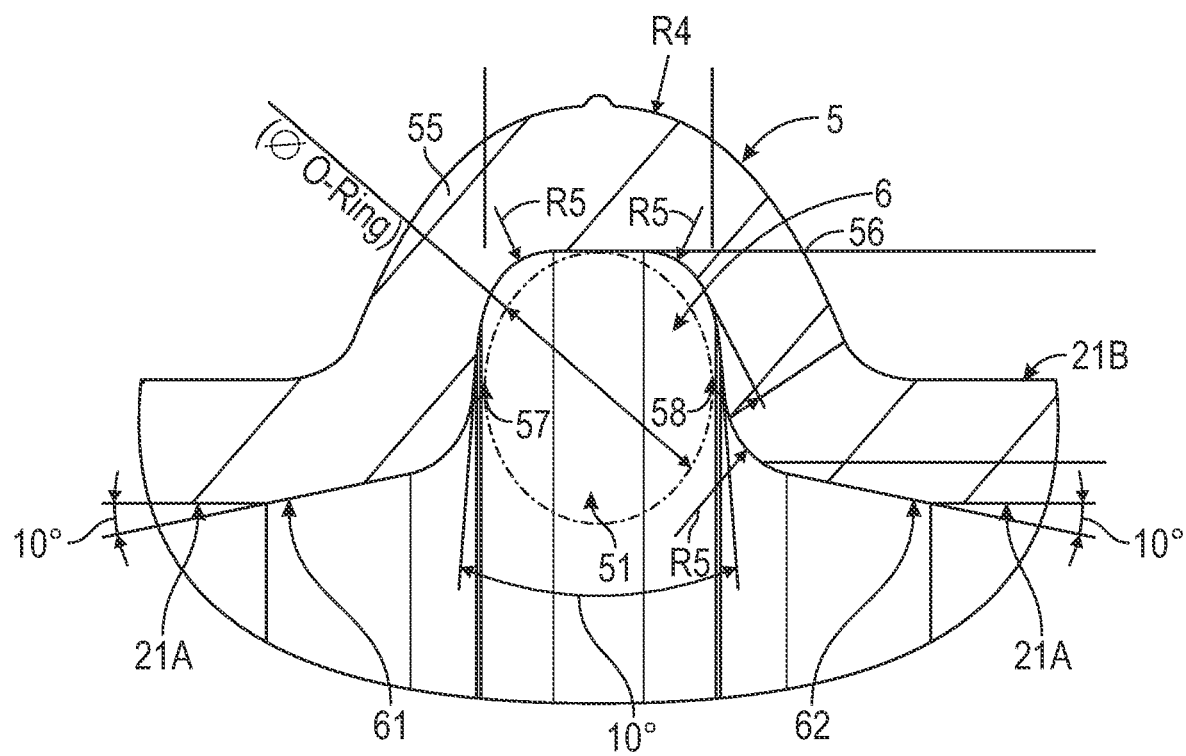
FIG. 3 is a section view of an enlarged detail of the connection of FIG. 1.

Characteristically for the invention, the first housing groove 51 for the sealing gasket 6, as clear also from FIG. 3 showing an enlargement thereof, comprises inclined annular inner walls 57, 58, the angle between said annular inner walls 57, 58 ranging from 5° to 15°. Preferably the angle between said annular inner walls 57, 58 ranges from 9° to 11°, still more preferably it is approximately equal to 10°. Annular inner walls 57, 58 are connected to the bottom wall of the first housing groove 51, that in turn is placed internally, in a position corresponding to the outer vertex of the V of the annular seat 5.

Figure 2:
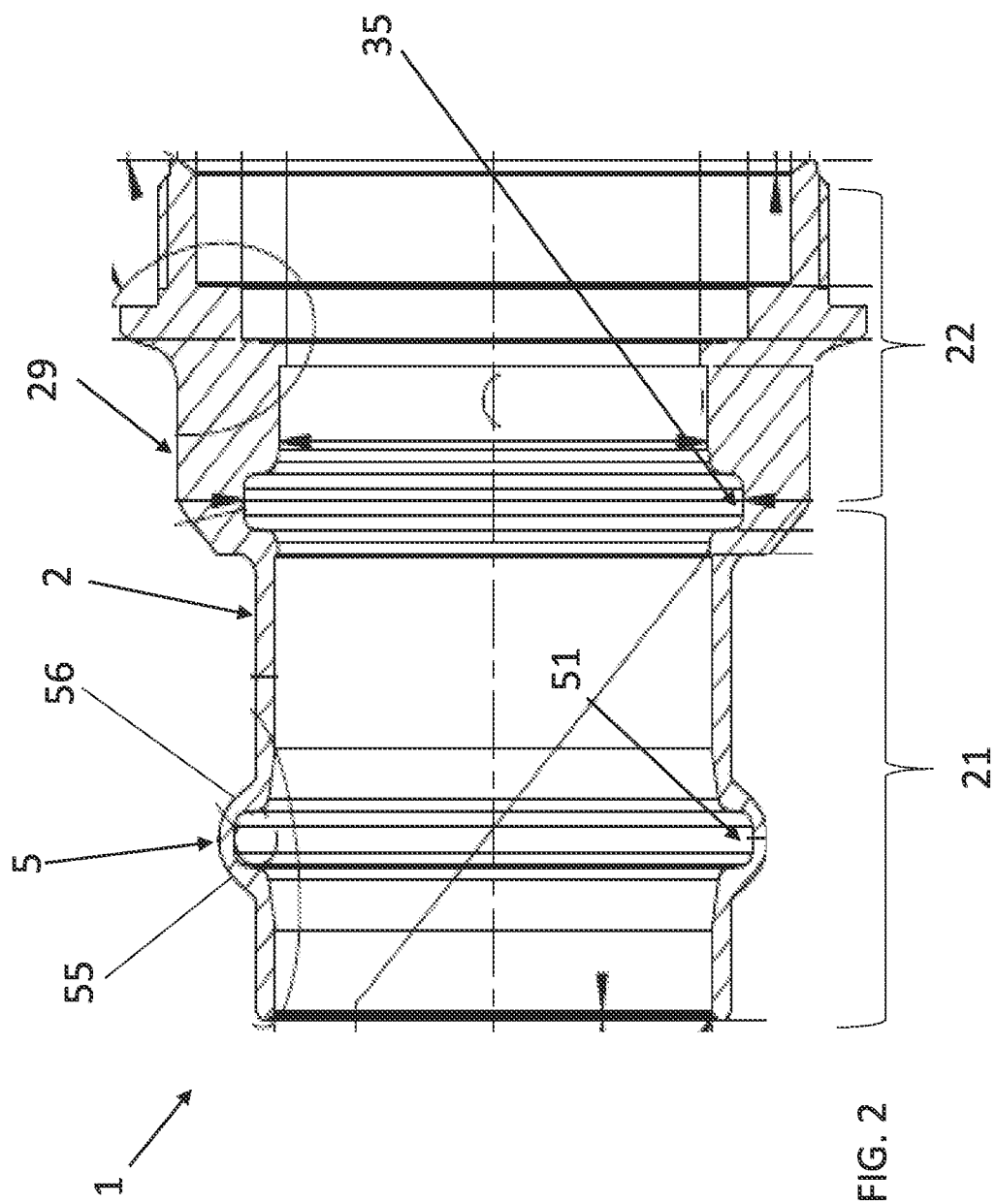
FIG. 2 is a section view of the connection of FIG. 1.

By observing FIGS. 2 and 3 it results that inclined annular inner walls 57, 58 laterally define the actual groove that has a substantially U shaped cross-section and limits the axial movements of the sealing gasket 6 with respect to the axis of pipe T. Thus besides improving uniformity of the plastic deformation, a LBP O-ring of different types can be housed, for instance: O-ring with parts missing with respect to a cylindrical chord, O-rings with (inner, outer, side, combined) additional parts with respect to a cylindrical chord, O-rings with polygonal shapes or proprietary profiles.

Still with reference to FIG. 3 such enlargement shows that the first housing groove 5 for the sealing gasket 6 is connected to an inner cylindrical wall 21A of the tubular engagement portion 21 by annular connection walls 61, 62 inclined with respect to the inner cylindrical wall 21A of the tubular engagement portion 21.

Such annular connection walls 61, 62 are each one adjacent to a corresponding annular inner wall 57, 58 and preferably connected thereto (with respect to the inner cylindrical wall 21A) according to a third fillet radius R5 equal, in this embodiment, to the first fillet radius R5 that connects the annular inner walls 57, 58 with the bottom of the first groove 51. Annular connection walls 61, 62 are inclined with respect to the inner cylindrical wall 21A by an angle ranging from 5° to 20°, preferably approximately equal to 10°. Such aspect allows effects of plastic deformation during installation to be optimized besides improving the step inserting the gasket 6.

To this end, the Applicant has experimentally verified that such geometry solves two problems that affected component deformability, briefly mentioned below. Firstly, without such inclination, during the deformation the material does not have a preferential travelling direction, therefore it tends to radially move while deforming (radially) the pipe; on the contrary by using the above geometry the radial deformation of the pipe is reduced, if not cancelled, thus reducing or avoiding the risk of such radial deformations triggering crack generating phenomena.

Secondly, especially with steel pipes, without a preferential travelling direction determined by the particular geometry identified herein, the pressing of such pipes (more resistant to deformation) generates excessive stresses in the material or results in tools being jammed, not being able to complete the operation. Finally it has to be noted that the more homogeneous deformation determined by the invention guarantees a better compression of the O-ring and therefore a better tightness.

According to the preferred embodiment of the invention described herein the annular seat 5 protrudes externally from the tubular engagement portion 21 by a substantially inverted "V" shaped profile; such profile comprises, to this end, at least two inclined annular outer walls 55, 56, extending from the cylindrical wall of the engagement portion 21 then converging at the vertex of the inverted V shaped profile, which vertex is—in this embodiment—rounded according to a second fillet radius R4. It has to be noted that the second fillet radius R4 preferably ranges from 2.5 to 4.5 mm.

With reference again to annular outer walls 55, 56 of the annular seat 5 they are connected with an outer cylindrical wall 21B of the tubular engagement portion 21 according to a first fillet radius R1 equal for both the annular outer walls 55, 56.

At the vertex of the V profile of the annular seat 5 the annular outer walls 55, 56 are connected by a second fillet radius R4 different from the first fillet radius R1. As regards annular outer walls 55, 56 the angle therebetween, as a preference but not binding, ranges from 55° to 75° depending on the diameter of the tubular connection. After several studies and laboratory tests, the Applicant has found that this angle is able to allow different tools or pliers to be used to generate plastic deformation of the connection 1 of the invention, particularly tools (or pliers) that in the art are classified, on the basis of geometrical profile, as V, M, SA, VUS and it is applicable both to copper and steel pipes.

It has to be noted, parenthetically, that steel is used since it is corrosion and high temperature resistant, it is suitable for being used in applications requiring high sanitary properties (drinking water, contact with food, pharmaceutical substances and drugs) since it does not absorb and it does not release harmful substances; moreover it can be used with glycol solutions, combustible gases, compressed air, fuel and non-fuel oils; steel further has a high bending strength and therefore allows support points to be minimized upon installation.

Copper is used since it is resistant to corrosion and high temperatures, it is suitable for being used with drinking water since it does not absorb and it does not release harmful substances; moreover it can be used with glycol solutions, combustible gases, compressed air, fuel and non-fuel oils; copper further has high ductility by means of which it is possible to implement plants with complicated paths and curvatures; copper further is easy to be weld with weld material.

As regards fillet radius R1, R3, R4 they can change depending on needs and constructional choices. Therefore preferably the first fillet radius R1 ranges from 0.5 to 1.5 mm and the second fillet radius R4 ranges from 2.5 to 4.5 mm, By observing FIG. 2, in section, it has to be noted that the terminal flange portion 22 comprises or has, internally, a second annular groove 35. Such second annular groove 35 is placed internally to the terminal flange portion 22 at a wall portion having a thickening with respect to the wall of the tubular engagement portion 21.

The shape and position of the second annular groove 35 depend on the outer profile of the piece: in practice, such second groove has to guarantee wall thicknesses as much similar as possible to those of the cylindrical section of the portion 21; thus the response of the material to deformation is homogeneous even outside the contact region between component and jaw, as pointed out below by FEM analysis. The second groove 35 is useful to guarantee a uniform distribution of stresses generated by plastic deformation: from experimental tests and finite element calculations (FEM) the Applicant has found that if a good deformability of the piece for a sufficient length is not guaranteed, then stresses overcome the strength limit of the material generating failures or cracks. By the presence of the groove, a tubular engagement portion 21 is generated with such thicknesses to allow stresses to be distributed more homogeneously.

Figure 4:
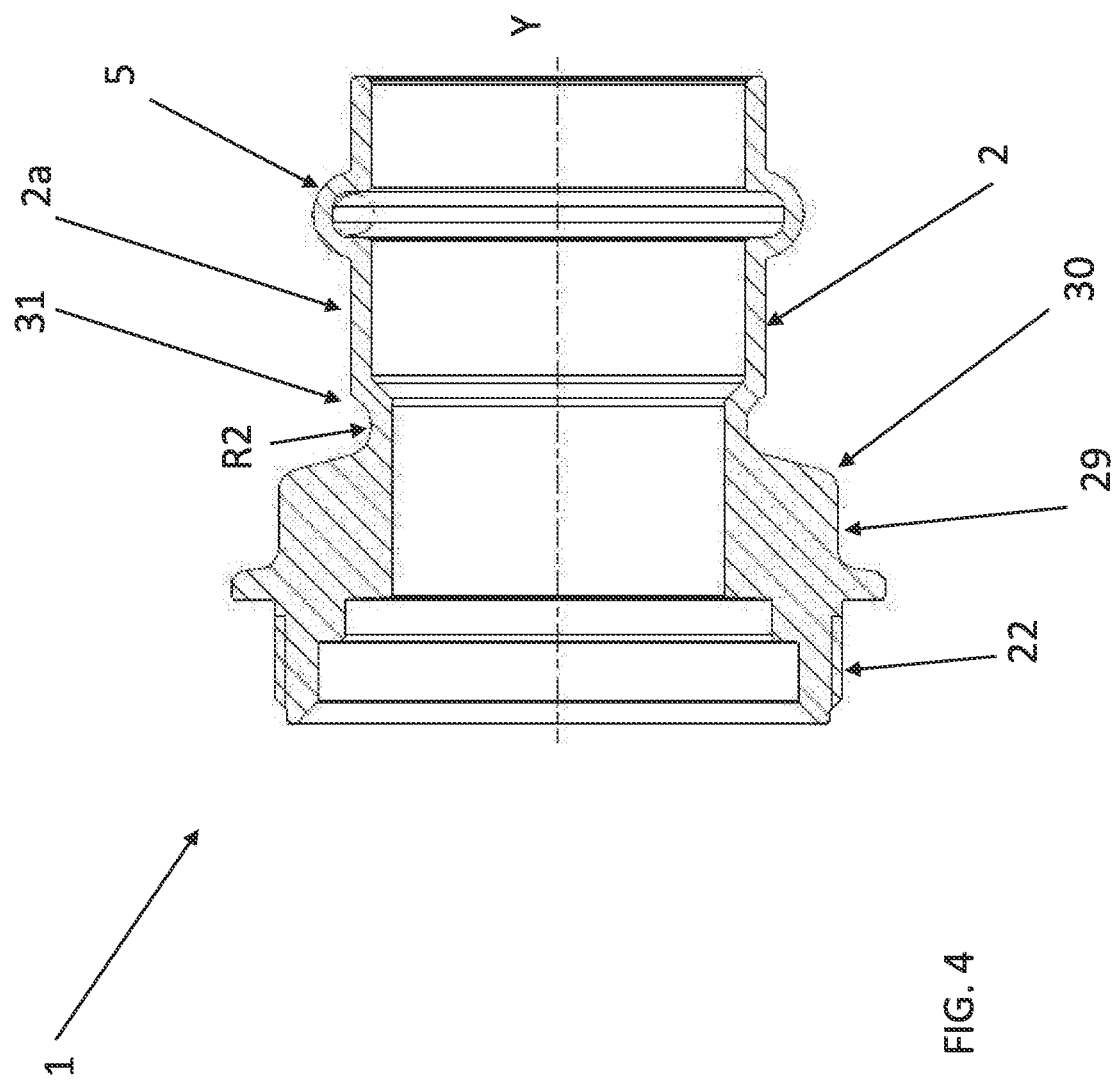
FIG. 4 is a section view of a variant embodiment of the connection of FIG. 1.

As an alternative to the provision of said second annular groove 35, in other variant embodiments of the invention, shown by way of example in FIG. 4, it is possible to obtain a proper distribution of stresses by using, in addition to the inner profile of the annular seat 5, in the connection area 30 between the tubular body 2 and the hexagonal profile 29 mentioned above, a radius R2 having however a center displaced with respect to the outer side surface 2a and therefore to the one of the radius R2 of the first solution of the invention shown in such FIG. 1, namely closer to the longitudinal axis of symmetry Y of the tubular body 2.

That is to say, in such variant embodiment of the connection 1 of the invention, alternative to the one previously described as for technical effect, the tubular body 2 has an outer annular recess 31 obtained in its outer side surface 2a at the connection area 30 between tubular body 2 and hexagonal profile 29 (the same where in FIG. 1 the fillet radius R2 is provided).

Such additional constructional solution allows also the overall length of the connection system to be reduced and therefore allows material to be saved and the overall dimensions of the component to be reduced; moreover the Applicant has found that in case of steel pipes with diameters equal to or greater than 42 mm (particularly hard to be deformed), together with the inner profile of the annular seat 5, such solution causes the force necessary for the proper deformation to be reduced and allows tools to accomplish the pressing without jamming.

Therefore the description just mentioned points out how the metallic pipe connection of the invention achieves the above objects and accomplishes the advantages listed above. In implementation phase changes can be made to the metallic pipe connection of the invention, for example sealing gaskets different from those described in the present invention, which does not invalidate the advantage produced by the invention. It is clear that many other variants can be made to the metallic pipe connection under examination, without for this reason departing from novelty principles of the inventive idea, as well as it is clear that, when practically carrying out the invention, materials, shapes and dimensions of shown details can be any and can be replaced by other technically equivalent ones.

When constructional characteristics and techniques mentioned in the following claims are followed by reference signs or numerals, such reference signs have been introduced only with the aim of increasing comprehensibility of the claims, and accordingly they do not have any limiting effects on the interpretation of each element identified, merely by way of example, by such reference signs.

The invention claimed is:

1. A metallic pipe connection, comprising a tubular body that has two opposite open ends, the metallic pipe connection comprising:
   a) a terminal tubular engagement portion configured to be engaged, in operative condition, on a pipe, and to be fixed thereto by means of plastic deformation of said tubular engagement portion;
   b) a terminal flange arranged on an opposite side of the tubular body with respect to a side of the tubular body that the tubular engagement portion is positioned;
   c) wherein said tubular engagement portion comprises an annular seat for a sealing gasket, said annular seat projecting externally from said tubular engagement portion and being provided with a first housing groove for said sealing gasket, said first housing groove being internally open towards said tubular engagement portion; and
   d) wherein at least part of said tubular engagement portion and said annular seat are configured to be plastically deformed such to generate a mechanical seal on said pipe on which said tubular engagement portion is fitted and a contemporaneous fluid tightness between said connection and said pipe by means of said sealing gasket,
   e) wherein said first housing groove for said sealing gasket comprises inclined annular inner walls, the angle between said annular inner walls ranging from 5° to 15° and
   f) wherein the annular inner walls being symmetric with respect to a radial plane of the said annular seat;
   g) wherein said first housing groove for said sealing gasket is connected with an inner cylindrical wall of said tubular engagement portion by means of annular connecting walls inclined with respect to said inner cylindrical wall of said tubular engagement portion by an angle ranging from 5° to 20°.

2. A metallic pipe connection according to claim 1, wherein said angle between said annular inner walls ranges from 9° to 11°.

3. A metallic pipe connection according to claim 2, wherein said angle between said annular inner walls is approximately equal to 10°.

4. A metallic pipe connection according to claim 3, wherein the annular outer walls are connected with an outer cylindrical wall of said tubular engagement portion according to a first fillet radius equal for both of said annular outer walls and are connected with each other at the vertex of the "V" of said substantially inverted V-shaped profile according to a second fillet radius different from said first fillet radius.

5. A metallic pipe connection according to claim 1, wherein said annular seat protrudes externally from said tubular engagement portion with a substantially inverted "V"-shaped profile comprising at least two inclined annular outer walls, the angle between said annular outer walls ranging from 55° to 75°.

6. A metallic pipe connection according to claim 1, wherein said angle of inclination of said annular connecting walls is approximately equal to 10°.

7. A metallic pipe connection according to claim 1, wherein said terminal flange internally comprises a second annular groove.

8. A metallic pipe connection according to claim 1, wherein said tubular body, in the outer side surface, at the connection region between said tubular body and a hexagonal profile separating said tubular body from said terminal flange, has an annular outer recess provided with a radius having a center closer to the longitudinal axis of symmetry of said tubular body than said outer side surface.

* * * * *